United States Patent [19]

Campbell

[11] 4,198,830
[45] Apr. 22, 1980

[54] FLUID CONDITIONING APPARATUS AND SYSTEM

[75] Inventor: Carl D. Campbell, Cerritos, Calif.

[73] Assignee: The Garrett Corporation, Los Angeles, Calif.

[21] Appl. No.: 921,660

[22] Filed: Jul. 3, 1978

[51] Int. Cl.² .................. F25B 9/00; F28B 9/00; F25D 9/00
[52] U.S. Cl. ........................... 62/87; 62/172; 62/402
[58] Field of Search ............... 62/87, 402, 172

[56] References Cited

U.S. PATENT DOCUMENTS

| 2,077,315 | 4/1937 | Ewing et al. | 62/402 |
| 2,485,590 | 10/1949 | Green | 62/87 |
| 2,526,103 | 10/1950 | Wood | 62/402 |
| 2,585,570 | 2/1952 | Messinger et al. | 62/402 |
| 2,614,815 | 10/1952 | Marchant et al. | 62/402 |
| 2,835,340 | 5/1958 | McGuff et al. | 62/93 |
| 2,902,836 | 9/1959 | LeMay et al. | 62/172 |
| 2,979,916 | 4/1961 | Mason | 62/172 |
| 3,052,106 | 9/1962 | Sampietro et al. | 62/402 |
| 3,093,470 | 6/1963 | Melikian et al. | 62/402 |
| 3,144,317 | 8/1964 | Arnoldi | 62/402 |
| 3,165,903 | 1/1965 | Roc et al. | 62/93 |
| 3,226,948 | 1/1966 | Alderson et al. | 62/93 |
| 3,587,243 | 6/1971 | Keller | 62/93 |
| 3,623,332 | 11/1971 | Fernandes | 62/402 |
| 3,877,246 | 4/1975 | Schutze | 62/402 |

Primary Examiner—Lloyd L. King
Attorney, Agent, or Firm—Joel D. Talcott; Albert J. Miller

[57] ABSTRACT

Fluid to be conditioned is admitted to first passageways of a heat exchanger and thereafter to a point of use, traversing flow conducting means which include the second passageways of the heat exchanger and fluid conditioning means which reduces the energy level of the fluid admitted to the second passageways below the energy level of the fluid admitted to the first passageways so as to increase the energy level of the fluid flowing through the second passageways by heat exchange with the fluid flowing through the first passageways.

18 Claims, 1 Drawing Figure

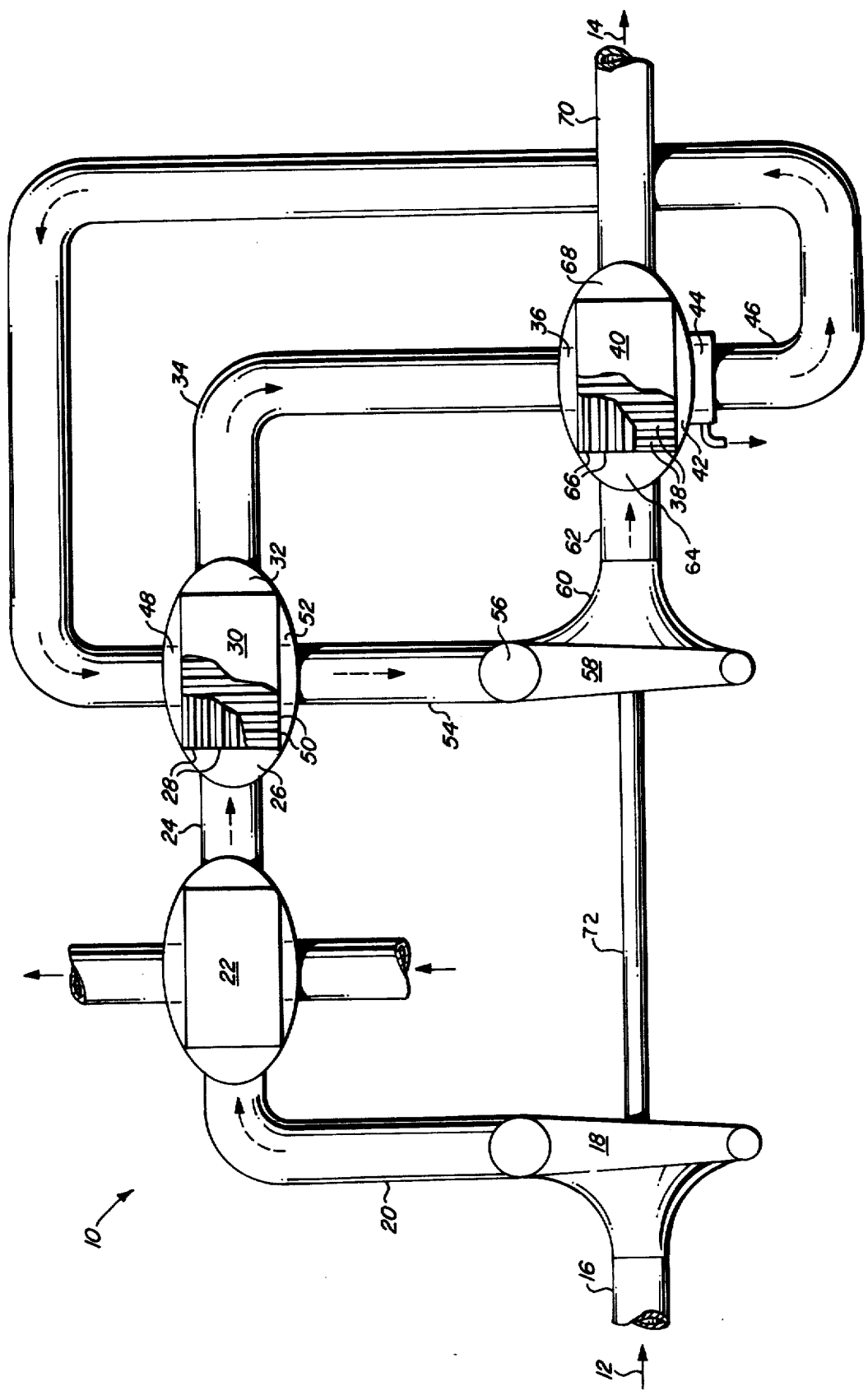

FLUID CONDITIONING APPARATUS AND SYSTEM

BACKGROUND OF THE INVENTION (1) Field of the Invention

This invention pertains generally to fluid conditioning apparatus, and is more particularly concerned with air conditioning apparatus and systems such as employed, by way of example, in aircraft.

(2) Description of the Prior Art

The prior art of fluid conditioning systems is typified by several generally conventional approaches to the problems of elastic fluid conditioning, which usually provide for the removal of entrained moisture from the ambient air admitted to the air conditioning system of an occupied vehicle such as an aircraft. Such a typical system utilizes a source extracting air from the ambient atmosphere and compressing it for use, such as a jet engine or other compressing source onboard the aircraft. The compressed air may be passed in heat exchange with a heat sink, as for example ducted ambient air, to reduce its heat content, after which it may be subjected to additional energy extraction to accomplish pressure reduction and still further temperature drop, as for example by use of an expansion turbine.

If the source air contains any amount of moisture up to the point of admission to the turbine, condensation of a large portion of the water may occur in or immediately downstream of the turbine, and steps to extract or separate the condensed water from the entraining stream are essential. In the usual case, the air at this stage is a relatively low pressure and the separator component comprises a water separator enclosing a coalescer bag to coalesce the water (which is in mist or fine droplet form) into relatively larger droplets. The separated water then drains off the bag and is removed from the separator component by means well known in the art.

Since the water separation takes place in the low pressure sector of the system, the marginal element is the water separator per se because it has been discovered that this component is extremely susceptible to the operating environment. That is, an unfavorable environment can escalate the servicing frequency of the coalescer bag to more than a nuisance value inasmuch as the required dense bags become easily contaminated. Attempts to alleviate this problem by exploring numerous paths of development of materials for coalescing the mist and droplets have been uniformly unsuccessful.

It was then considered that removal of the moisture upstream of the expansion turbine, or other expanders, in the zone of higher pressure, could be accomplished with condensing means other than coalescer bags by utilizing the low temperature discharge air of the turbine to cool the turbine inlet air to the desired level in a condenser heat exchanger. By this means a significant percentage amount of the entrained moisture could be condensed at a relatively warm temperature. However, in the past the major drawback to the high pressure water separation has been that the reduction in turbine inlet temperature to achieve the desired condensation has resulted in a loss of turbine power with a resulting loss of cycle efficiency and performance. Attempts to overcome this problem of loss in performance have resulted in complications such as condensor bypass circuits and the like.

With this background in mind it was further conceived that the relatively simple addition of a reheater heat exchanger upstream of the expander would be a major step forward to the problem solution, as was proven by a design study followed by actual reduction to practice in a development embodiment.

SUMMARY OF THE INVENTION

Accordingly, the invention has for its general object the improvement of fluid conditioning apparatus coupled with a source of fluid to be conditioned and with a point of use of the conditioned fluid. A principal object is to provide improvement of apparatus of the type mentioned having a heat exchanger defining a pair of passageways in heat exchange relationship, with the fluid to be conditioned being admitted to one of these passageways and thereafter ducted by fluid flow conducting means through fluid conditioning means and the other of two passageways to the point of use, wherein the energy level of the fluid admitted to the other of the passageways is lower than that of the first mentioned passageway.

A particular object is the improvement of apparatus of the type mentioned, for use in air conditioning systems wherein the fluid conditioning means is comprised of a fluid energy extraction means such as an air expansion means which may take the form of an expansion turbine. It is a further object to improve air conditioning apparatus of the type mentioned by providing a second heat exchanger likewise defining a pair of passageways in heat exchange relationship, and having the outlet of first mentioned passageway of the first mentioned heat exchanger coupled by duct means to the inlet of one of the passageways of the second heat exchanger, the outlet of which is coupled by duct means to the inlet of the other of the passageways of the first mentioned heat exchanger, the outlet of which is coupled by the above-mentioned fluid flow conducting means through the other of the two passageways of the second heat exchanger to the point of use.

It is a still further object to provide apparatus of the type in which the air expansion means is disposed as a part of the fluid flow conducting means so that the air leaving the other of the two passageways of the first mentioned heat exchanger is expanded before being admitted to the other of the two passageways of the second mentioned heat exchanger.

It is a further particular object to provide apparatus of the above-mentioned type in which the second mentioned heat exchanger has fluid condensation qualities in its other of the two passageways such that water entrained in the air from the source may be substantially removed therefrom before the air is admitted to the air expansion means.

Other and further objects will be apparent at once to those skilled in the art upon consideration of the drawing when considered in connection with the description thereof herein told.

BRIEF DESCRIPTION OF THE DRAWING

The single FIGURE on the drawing depicts a system schematic including the apparatus of the invention.

DESCRIPTION OF THE PREFERRED EMBODIMENT

Referring to the drawing, the schematic of the system 10 defines an open cycle flow path for air to be admitted thereinto from a compressed air source, not shown but designated generally by the arrow 12, and thereafter to be conducted to a point of use, also not shown but designated generally by the arrow 14. The source may be the jet engines or other compressed air source of the aircraft whose cabin is the point of use. Additionally, the conditioned air may also be conducted, in part, to other cooled air using components onboard, such as electronic, avionic and/or defogging apparatus.

The source air is conducted by a duct 16 to the intake of a compressor 18, the exhaust of which is coupled by a duct 20 to the cooling pass of a heat exchanger 22. In the compressor the pressure of the compressed air is increased about twice, for example, and the heat of compression is thereafter extracted by the cooler air in the heating pass of the heat exchanger 22 and dumped overboard to the ambient sink in a known manner. As used above and throughout the specification the terms "cooling pass (or passageways)" and "heating pass (or passageways)" refer to the action upon the fluid therein.

From the cooling pass of the heat exchanger 22, the source air is conducted by a duct 24 to the inlet 26 of the cooling passageways 28 of a heat exchanger 30. From an outlet 32 of the passageways 28 the source air is conducted through a duct 34 to the inlet 36 of the cooling passageways 38 of the condenser heat exchanger 40. In traversing these cooling passageways 38 the air is cooled to the degree that the desired amount of entrained moisture is subjected to condensation, with the condensed water droplets being collected in a water trap 44 from which the water may be conducted overboard or, in one embodiment, may be conducted to spray nozzles (not shown) at the intake to the heating pass of the heat exchanger 22, to impart additional cooling to the source air conducted through the cooling pass thereof.

From the trap 44 the source air is conducted by a duct 46 to the inlet 48 of the heating passageways 50 of the heat exchanger 30, the said heating passageways 50 being in heat exchange relationship with the cooling passageways 28 to effect extraction of heat from the upstream air and add the heat to the downstream air. Essentially, the heat exchanger 30 is a reheater for the downstream air which is conducted from the outlet 52 for the heating passageways 50 through a duct 54 to the intake 56 of an expansion turbine 58 whose exhaust 60 is coupled by a duct 62 to the inlet 64 of the heating passageways 66 which are in heat exchange relationship with the cooling passageways 38 of the heat exchanger 40. From the heating passageways 66 the air is conducted through the outlet 68 by a duct 70 to the point of use.

The turbine 58 is coupled by a power transmission shaft 72 to the compressor 18 whereby the energy extracted from the air by expansion in the turbine is converted to power transmitted to the compressor in known bootstrap fashion. It is obvious to those skilled in the art that the power output of the turbine could be utilized in any preferred manner in addition to, or in place of, transmission to the compressor.

It will be particularly observed that the low temperature decompressed air from the turbine exhaust is substantially dry and is effective to lower the temperature of the upstream compressed air in the cooling passageways 38 of the condenser 40 to achieve substantial condensation of the entrained moisture. Hence the air admitted to the point of use is substantially dry, having had the desired amount of moisture removed before being de-compressed and having subsequently been heated to assure the re-evaporation of any residual moisture. It will be obvious to those skilled in the art that the novelty of this arrangement resides in the concept of reheat of the source air upstream of the turbine as embodied in the reheater heat exchanger 30.

The capabilities of such an arrangement were shown in one operational regime of the above-mentioned development embodiment wherein source air entering the cooling passageways of the reheater heat exchanger at a temperature of, for example 150° F. with moisture content of 154 grains per pound of air, the conditioned air conducted to the point of use had dropped to 40° F. dry bulb with a moisture content of 30 grains per pound of air.

It will be further evident to those skilled in the art that the maintenance problem of an arrangement as described has been essentially eliminated when compared with prior art arrangements which necessarily required coalescer bags or the like for water removal.

I claim:

1. A system for conditioning a working fluid in a fluid flow path, the working fluid comprising a mixture of first and second gaseous fluids, said system comprising:
   (a) first and second heat exchange means each defining first and second fluid passageways providing heat exchange relationship between the fluids in said passageways, each of said passageways having fluid inlet and outlet means;
   (b) first duct means in the fluid flow path and coupling a source of the working fluid to said fluid inlet means of said first fluid passageway of said heat exchange means;
   (c) second duct means in the fluid flow path and coupling said fluid outlet means of said first fluid passageway of said first heat exchange means to said inlet means of said first fluid passageway of said second heat exchange means;
   (d) third duct means in the fluid flow path and coupling said fluid outlet means of said first passageway of said second heat exchange means to said fluid inlet means of said second fluid passageway of said first heat exchange means;
   (e) fourth duct means in the fluid flow path and coupling said fluid outlet means of said second fluid passageway of said first heat exchange means to said fluid inlet means of said second fluid passageway of said second heat exchange means;
   (f) fifth duct means in the fluid flow path and coupling said fluid outlet means of said second fluid passageway of said second heat exchange means to a point of use for the conditioned fluid; and
   (g) liquid extraction means disposed in said third duct means to extract from the working fluid the condensate of said one of said first and second gaseous fluids.

2. The system of claim 1 further comprising fluid energy extraction means disposed in the fluid flow path in one of said duct means for extracting energy from the fluid flowing therethrough.

3. The system of claim 2 in which said fluid energy extraction means comprises elastic fluid expansion means.

4. The system of claim 3 in which said elastic fluid expansion means comprises expansion turbine means.

5. The system of claim 2 in which said fluid energy extraction means is disposed in the fluid flow path in said fourth duct means.

6. The system of claim 5 in which said fluid energy extraction means comprises elastic fluid expansion means.

7. The system of claim 6 in which said elastic fluid expansion means comprises expansion turbine means.

8. The system of claim 2 further comprising:
(a) fluid energy generating means disposed in said fluid flow path for imparting energy to the fluid flowing therethrough; and
(b) power transmission means coupling said energy extracting and energy generating means,
whereby the power output of said energy extracting means is applied as a power input to said energy generating means.

9. The system of claim 8 in which said fluid energy generating means is disposed in said flow path upstream of said fluid energy extracting means.

10. The system of claim 9 in which fluid energy generating means is disposed in said first duct means and said fluid energy extracting means is disposed in the fluid flow path in said fourth duct means.

11. The system of claim 10 in which said energy generating and energy extracting means are bladed rotary compressor and expansion turbine means, respectively, coupled by a common power transmission shaft means.

12. An air conditioning system for an aircraft having a source of compressed air comprising:
(a) a first heat exchanger having a first passageway with an inlet thereinto coupled to the compressed air source;
(b) a second heat exchanger having a first passageway with an inlet thereinto coupled with the outlet of said first passageway of said first heat exchanger, each of said first and second heat exchangers having respective second passageways in heat transfer relationship with respective said first passageways;
(c) first duct means coupling the outlet of said first passageway of said second heat exchanger with the inlet of said second passageway of said first heat exchanger; and
(d) second duct means coupling the outlet of said second passageway of said first heat exchanger with the inlet of said second passageway of said second heat exchanger,
the outlet of said second passageway of said second heat exchanger being coupled to a point of use of conditioned air, said second heat exchanger serving to condense water entrained in the air passing through said first passageway of said second heat exchanger.

13. The system of claim 12 further comprising expansion turbine means disposed in said second duct means with the intake and exhaust, respectively, of said turbine means being adapted to receive air from the outlet of said second passageway of said first heat exchanger and discharge into the inlet of said second passageway of said second heat exchanger.

14. The air conditioning system of claim 13 further comprising compressor means whose power input is coupled with power output of said expansion turbine means, said compressor being disposed intermediate the compressed air source of the aircraft and the inlet of said first passageway of said first heat exchanger so as to impart energy to the source air to be thereafter extracted, at least in part, by said turbine means and returned to said compressor means in and energy conversion cycle.

15. The system of claim 12 further including water trap means to separate said condensed water from said source air and collect for disposal, said water trap means being disposed in said first duct means intermediate said first passageway of said second heat exchanger and said second passageway of said first heat exchanger.

16. The method of conditioning a moisture entraining gaseous fluid from a source of pressurized fluid with first and second heat exchangers, each having first and second passageways providing heat exchange between the fluids therein, said method comprising the steps of:
(a) conducting the fluid from the source through said first passageway of said first heat exchanger;
(b) conducting the fluid from said first passageway of said first heat exchanger through said first passageway of said second heat exchanger;
(c) conducting the fluid from said first passageway of said second heat exchanger through said second passageway of said first heat exchanger;
(d) conducting the fluid through fluid cooling means;
(e) conducting the cooled fluid flow from said cooling means through said second passageway of said second heat exchanger to cause a cooling of the fluid in said first passageway thereof and effect therein a condensation of moisture entrained in the gaseous fluid;
(f) separating the condensation product from the gaseous fluid and conducting it away; and
(g) conducting the remaining gaseous component of the gaseous fluid to a point of use of the conditioned fluid.

17. The method of claim 16 conducted with a gaseous fluid expansion device to expand and cool the pressurized gaseous fluid intermediate its conduction from said second passageway of said first heat exchanger to said second passageway of said second heat exchanger.

18. The method of claim 17 conducted with a bladed gaseous fluid compressing device to compress the gaseous fluid upstream from said first passageway of said first heat exchange, said compressing device being coupled to said expansion device to extract energy therefrom.

* * * * *